United States Patent [19]
Kumpf

[11] Patent Number: 5,546,700
[45] Date of Patent: Aug. 20, 1996

[54] FLUID LEVEL CONTROL SYSTEM

[76] Inventor: William J. Kumpf, 295 Continental Dr., Lockport, N.Y. 14094

[21] Appl. No.: 319,641

[22] Filed: Oct. 7, 1994

[51] Int. Cl.⁶ .................................................. A01G 25/00
[52] U.S. Cl. ...................................................... 47/79; 47/66
[58] Field of Search ................................. 47/79 I, 79 N, 47/62 E, 79 R, 66 R

[56]  References Cited

U.S. PATENT DOCUMENTS

| | | | |
|---|---|---|---|
| 1,272,713 | 7/1918 | Reily | 47/79 N |
| 2,387,340 | 10/1945 | Moriarty . | |
| 3,137,096 | 6/1964 | Hopkins | 47/79 N |
| 3,753,315 | 8/1973 | Adam . | |
| 3,903,644 | 9/1975 | Swift et al. . | |
| 4,335,540 | 6/1982 | Allen . | |
| 4,347,687 | 9/1982 | Sibbel . | |
| 4,653,529 | 3/1987 | Freeman . | |
| 4,663,884 | 5/1987 | Zeischegg et al. . | |
| 4,885,870 | 12/1989 | Fong . | |
| 4,993,186 | 2/1991 | Immonen . | |
| 5,010,687 | 4/1991 | Hougard . | |
| 5,044,120 | 9/1991 | Couch . | |
| 5,107,621 | 4/1992 | Deutschmann, Sr. . | |

FOREIGN PATENT DOCUMENTS

| | | | |
|---|---|---|---|
| 2305123 | 10/1976 | France | 47/79 I |
| 3020915 | 12/1981 | Germany | 47/79 I |
| 3338129 | 5/1985 | Germany | 47/79 I |

*Primary Examiner*—Terry Lee Melius
*Assistant Examiner*—Joanne C. Downs
*Attorney, Agent, or Firm*—Brooks & Kushman P.C.

[57] ABSTRACT

A fluid level control for a container having a space to which fluid is supplied from a reservoir. The specifically disclosed application for the invention is a water level controlled planter. The fluid level control system includes a compartment in which fluid level is controlled. One or more removable plugs can be inserted in two or more fluid level control holes at different levels in the compartment. An air lock prevents air from flowing into the reservoir when the water level within the compartment is above the fluid level control hole. When the water level in the compartment falls below the uppermost open fluid level control hole, air is permitted to enter the reservoir and water may flow through the fluid level control hole into the compartment.

20 Claims, 2 Drawing Sheets

FLUID LEVEL CONTROL SYSTEM

TECHNICAL FIELD

This invention relates to a container which defines a compartment to which fluid is supplied from a reservoir. More particularly, this invention relates to a container having a fluid dispensing reservoir which dispenses fluid up to a controlled depth into the compartment.

BACKGROUND ART

Controllably dispensing fluid into a compartment from a reservoir is a common problem. Many devices have been developed including complex valve and pump systems, float controlled systems and drip dispensing systems. A simple and effective product having no moving parts and no critical seals was needed prior to this invention.

An example of a prior art application of such a device is a self-watering planter used to provide water to a plant for an extended period of time. Many household plants require watering on a weekly or more frequent basis depending upon the type of plant, humidity, soil type and other factors. Many people fail to regularly water their plants due to inadvertence. In addition, plants that require frequent watering may be neglected during vacation periods. Self-watering planters generally suffer from certain disadvantages such as complexity of the apparatus, excessive cost, tendency to overflow, or difficulty in refilling.

An example of a prior art device for irrigating flower pots is disclosed in U.S. Pat. No. 3,753,315 to Adam. The Adam device includes a hermetically sealed reservoir which includes a cap to maintain the hermetic seal in the reservoir. The flower pot disclosed in the Adam patent allows water to fill a lower cavity until the upper edge of an air entry opening at the bottom of an air pipe is covered. Water is fed to a sponge located in a cavity at the base of the flower pot. Water flow is regulated by evaporation of water from another cavity, which allows water to flow until the air entry opening is again covered by water.

Another example of a prior art approach is disclosed in U.S. Pat. No. 4,885,870 to Fong, which discloses a plant container comprising a pot surrounded by a water reservoir. A vent pipe permits air to enter an upper portion of the hermetically sealed reservoir when the lower end of the vent is not covered by water. The opening in which water is supplied to the planter is closed by a cap to maintain the hermetic seal in the reservoir.

Another example is disclosed in U.S. Pat. No. 3,903,644 to Swift et al, which discloses a vacuum-controlled water dispensing flower pot. The Swift patent discloses a planter having holes in the base of the reservoir which allow water to flow from the air-tight reservoir into the base of the planter. When the level of water in the planter is above the holes, the vacuum in the reservoir prevents the flow of water into the plant containing chamber. Upon removal of a cap from the reservoir, loss of vacuum pressure permits flooding of the plant containing portion of the planter.

The defects and problems encountered by the above-identified patents are solved by the simple and effective apparatus proposed in the invention as summarized below.

SUMMARY OF THE INVENTION

The present invention, as broadly conceived, relates to an apparatus which has an internal system for supplying a fluid within the apparatus comprising first and second compartments for containing the fluid. A fill nozzle for supplying the second compartment with fluid is provided. A wall in the second compartment forms an air lock channel. A first opening is formed between the first compartment and the air lock channel. An upper end of the air lock channel is open to the second compartment. A metering orifice is formed in the lower portion of the wall forming the air lock channel through which fluid can flow from the second compartment to the air lock channel until the fluid level in the air lock channel is equal with the level in the second compartment. Fluid covering the first opening substantially precludes dispensing fluid through the first opening because of a formation of an air lock in the air lock channel. The air lock is formed between an upper surface of the fluid in the first compartment when above the first opening and an upper surface of the fluid in the second compartment.

More specifically, the present invention relates to a container which includes an open compartment having a fluid level control hole in a lower portion of a first wall of the compartment. The container also has a reservoir. An air lock channel extends from a region of the container adjacent the fluid level control hole to the upper region of the reservoir. The air lock channel wall has a metering orifice forming an opening between the reservoir and the air lock channel in a lower portion of the air lock channel and reservoir. A fluid filling opening in the reservoir is provided to allow fluid to be supplied to the reservoir periodically. When the reservoir is filled, fluid flows into the reservoir through the fill tube. Fluid flows through the metering orifice into the air lock channel at a slow rate. Fluid continues to flow into the air lock channel until the fluid level of the air lock channel and reservoir are equal. The slow rate of fluid flow through the metering orifice into the air lock channel prevents excessive flooding of the open enclosure during filling. Fluid is dispensed through the fluid level control hole and into the open enclosure. The fluid level control hole is sealed by the fluid in the compartment. Additional fluid is supplied to the open compartment through the fluid level control hole when the level of fluid in the open compartment drops below the fluid level control hole allowing air to bubble into the air lock channel through the fluid level control hole.

According to another aspect of the invention, a water level controlled plant container is provided which has a cup-shaped soil and root compartment surrounded at least in part by a reservoir defined by a wall outboard of the soil and root enclosure. An air lock channel is defined by the container to extend from a port in the lower portion of the soil and root compartment to a point in the reservoir adjacent the top of the reservoir. A metering orifice is formed in the lower portion of the air lock channel to minimize flooding of the soil and root compartment during filling. A fluid level control hole is formed in the soil and root compartment at the desired level of maximum fluid fill of the soil and root compartment. As the fluid level in the soil and root compartment drops below the fluid level control hole, air is permitted to pass into the air lock channel and into the reservoir through the fluid level control hole. As air is admitted into the air lock channel, water is permitted to flow from the air lock channel through the fluid level control hole to provide water to the soil and root compartment up to a controlled level.

Other aspects of the invention include the provision of an inner container formed of a mesh, screen, or filter material which retains the soil and root matter of a plant potted in the container.

According to another aspect of the invention, a series of potential fluid level control holes may be provided in the compartment to which fluid is to be supplied to a controlled level. Removable plugs are inserted into the fluid level control holes to seal the hole and allow modification of the depth at which the fluid level is maintained.

According to another aspect of the invention, a fluid fill nozzle extends from the top portion of the apparatus to a point adjacent to the bottom of the reservoir. The top of the fluid fill nozzle preferably extends to a point below the level of the top of the air lock channel. The bottom of the fluid fill nozzle extends to a point within the reservoir below the level of the fluid level control hole.

According to another aspect of the invention, the metering orifice between the reservoir and the air lock channel is sized to permit only a small amount of fluid to flow from the reservoir to the air lock channel when the reservoir is being refilled.

According to the invention, fluid is supplied to the reservoir from an external source periodically. Thereafter, fluid flows from the reservoir through the metering orifice to the air lock channel. From the air lock channel fluid flows through the fluid level control hole into the soil and root compartment. The metering orifice controls the rate at which fluid is provided from the reservoir into the air lock channel. The fluid level control hole controls the maximum level to which fluid is provided to the soil and root compartment. When the fluid level in the soil and root compartment covers the uppermost fluid level control hole, the air lock formed between the upper level of the fluid in the soil and root compartment and the upper level of the fluid in the reservoir prevents further filling of the soil and root compartment.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
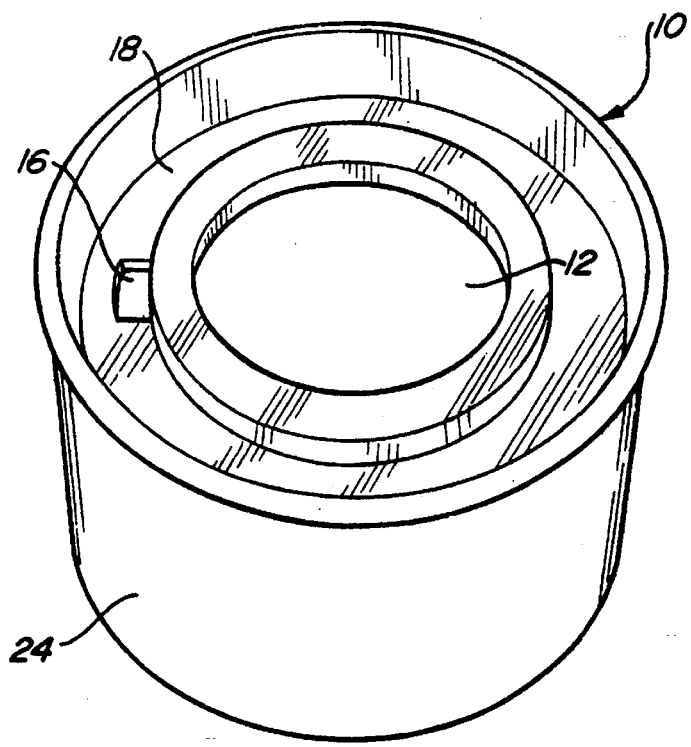
FIG. 1 is a perspective view of a self-watering plant container made according to the present invention.

Referring now to FIG. 1, a self-watering plant container 10 is shown in detail. The container 10 may be formed by any number of different processes including conventional plastic forming processes such as injection molding, rotocasting, or the like. Materials for construction of the container 10 may be either polystyrene or polypropylene. Many other materials may also be used including clay or other conventional materials used in the manufacture of plant containers. The container 10 is preferably formed in at least two separate pieces which are joined together. The two pieces may be joined by spin welding, or ultrasonic welding. Alternatively, glue, solvent or another bonding agent can be used to join the two parts together. Appropriate locations for joining the two parts together are shown in FIG. 3 at edges A and B.

Figure 2:
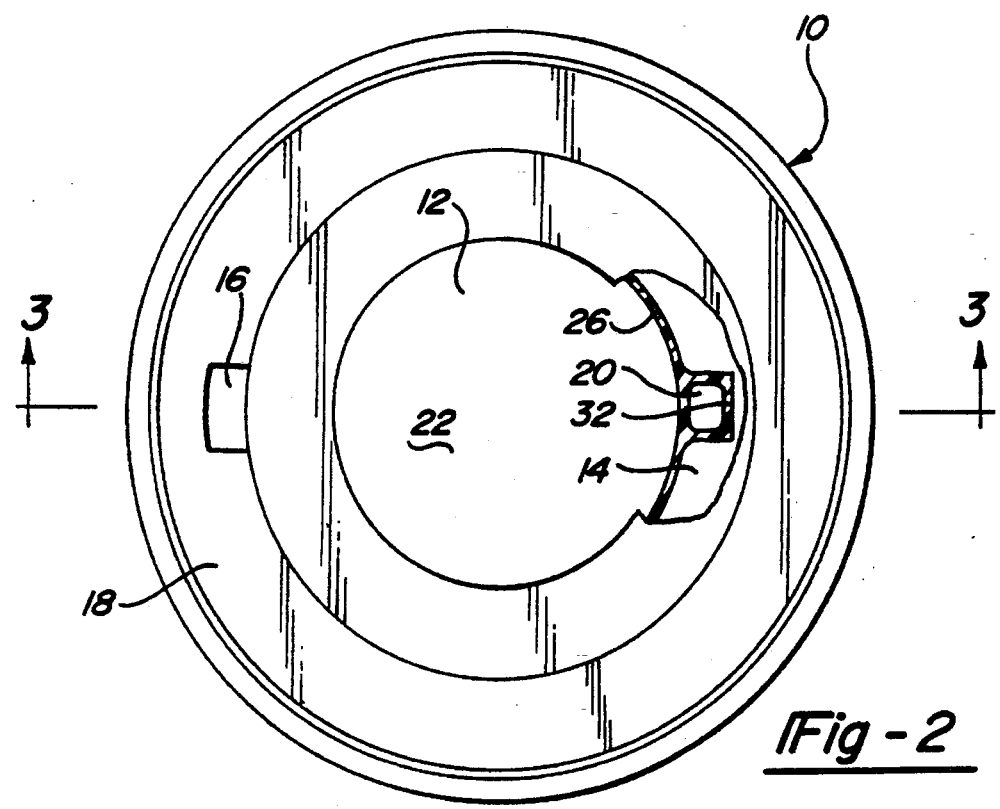
FIG. 2 is a cut-away plan view of the container shown in FIG. 1.

Referring to FIGS. 1 and 2, the container 10 includes a soil and plant compartment 12. A reservoir 14 forms part of the container 10 and is preferably outboard of the compartment 12. A fill tube 16 extends into the reservoir 14. A rim 18 is formed above the reservoir 14. Fill tube 16 extends downwardly from the rim 18. An air lock channel 20 is provided within the reservoir 14.

Figure 3:
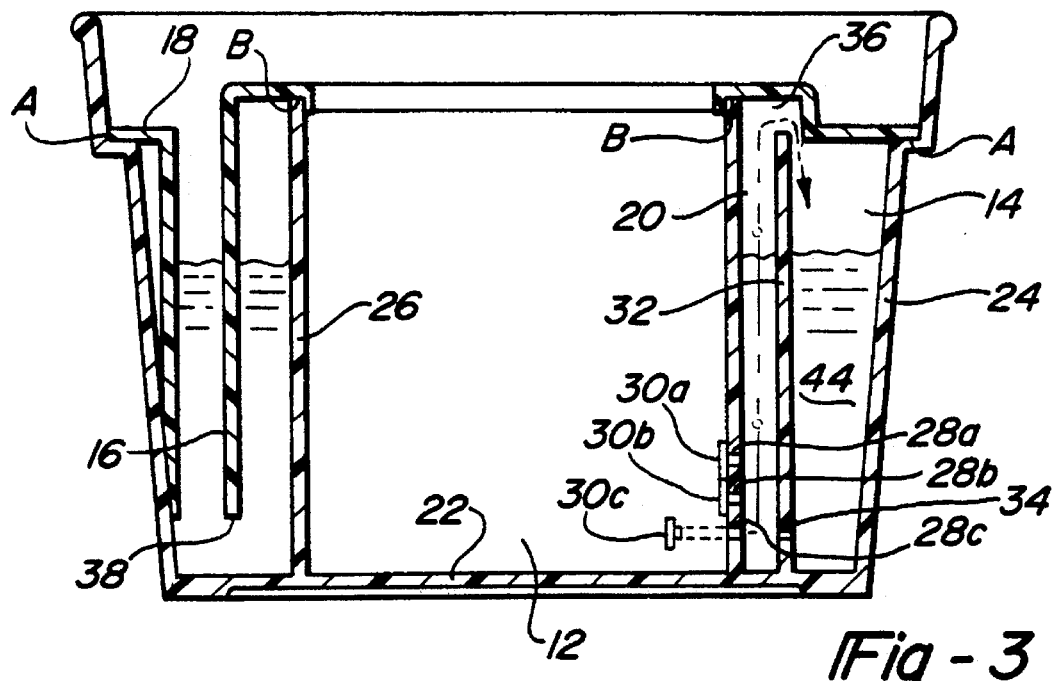
FIG. 3 is a fragmentary cross-sectional view taken along the line 3—3 in FIG. 2.

Referring now to FIGS. 2 and 3, the container 10 is shown to include a base 22. An outer wall 24 extends upwardly from the perimeter of the base 22. An inner wall 26 also extends upwardly from the base 22 at a point spaced radially inwardly from the outer wall 24. Fluid level control holes 28a, 28b and 28c are provided in the lower portion of the inner wall 26. Fluid level control holes 28a, 28b and 28c are located at different heights on the inner wall 26 to provide a mechanism for controlling the fluid level in the soil and root compartment 12. Plugs 30a, 30b and 30c are insertable into the respective fluid level control holes 28a, 28b and 28c. The uppermost of fluid level control holes 28a, 28b and 28c which is not covered by a plug determines the maximum fluid level which is maintained in the soil and root compartment 12.

Air lock channel 20 is defined by a weir wall 32 which extends upwardly from the base 22 and is preferably located between the outer wall 24 and the inner wall 26. The weir wall, as illustrated in FIG. 2, is generally U-shaped and connected to the inner wall 26. Alternatively, the weir wall 32 could be cylindrical or semi-cylindrical.

Figure 4:
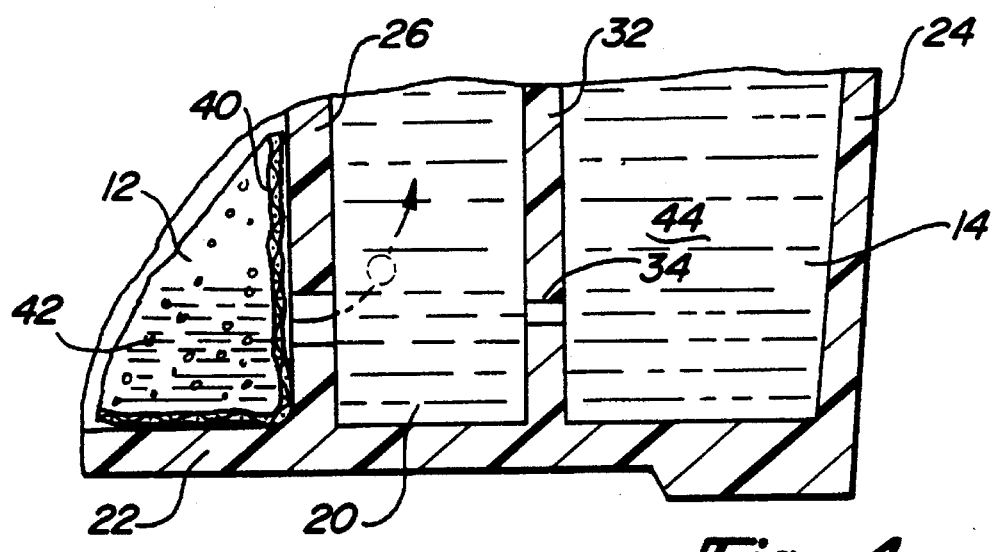
FIG. 4 is a cross-sectional view taken along the same plane as the cut-away of FIG. 2 and showing the container having fluid and soil in a mesh container according to the present invention.

Referring to FIGS. 3 and 4, a metering orifice 34 is provided in the lower portion of the weir wall 32. Metering orifice 34 allows fluid flow between the reservoir 14 and the air lock channel 20. An air passage 36 is provided under the rim 18. Air passage 36 extends over the top of at least a portion of the weir wall 32 in a spaced relationship so that an air pocket is defined in the air lock channel 20 and the upper portion of the reservoir 14.

The fill tube 16 extends from the rim 18 downwardly to a lower end 38 which is located adjacent the base 22. By extending the fill tube 16 into the lower region of the reservoir 14, preferably below the fluid level control hole 28c, the fill tube may remain uncapped without affecting the air lock formed in the air lock channel 20 and upper portion of the reservoir 14.

Referring now to FIG. 4, a liner 40 is preferably provided for the soil and root compartment 12. The liner 40 permits removal of the soil and root of a plant for replacement or adjustment of the plugs 30a, b and c in the fluid level control holes 28a, b and c. Soil 42 is shown within the liner 40. The liner 40 also serves to prevent plant roots from entering the air lock channel 20 and clogging the fluid level control holes 28a, 28b and 28c. Fluid 44, in the fill tube 16 and reservoir 14, may be at different levels. This may occur, for example, as a result of the development of an air pressure differential between the air pocket defined by the air lock channel 20 and upper portion of the reservoir 14 and ambient air pressure.

After filling the reservoir 14, water is permitted to trickle into the air lock channel 20 through metering orifice 34 until the water level in the air lock channel 20 is equal to the level in the reservoir 14. Water will flow from the air lock channel 20 into the soil and root compartment 12. Upon covering the fluid level control hole 28c in the illustrated embodiment, a hermetic seal is formed within the air lock channel and above the surface of the water in the reservoir 14. The water level in the soil and root compartment is controlled by the uppermost open fluid level control hole 28c.

Upon reaching equilibrium level in compartment 12 at the uppermost fluid level control hole 28c, the flow of water to compartment 12 stops until the plant uses a portion of the water in the soil and root compartment 12 or evaporation causes the fluid level to drop below the fluid level control hole 28c. It should be understood that while the soil in the compartment 12 is moist, the seal is effected by the saturation of soil below the fluid level control hole. The fluid level in compartment 12 is maintained at its saturation level. When the saturation level drops below the fluid level control hole 28c, air bubbles into the air lock channel 20 through the fluid level control hole and water is permitted to flow again through the fluid level control hole 28. This will continue until the fluid level in the reservoir 14 is depleted to a level below the fluid level control hole.

According to the invention, there is no need to cap the fill tube 16 at any time to maintain the hermetic seal in the air lock channel 20. Rim 18 facilitates filling the container 10 by catching any water that does not flow directly into the fill tube 16. The upper portion of the outer wall 24 is higher than the upper portion of the inner wall 26 so that water will flow into the plant if overfilled.

While the invention has been described with reference to a self-watering plant container, it should be understood that the simple and effective fluid supply system of the present invention may also find application in industrial systems. Many different shapes and sizes of plant containers and other containers can be developed without departing from the broad spirit and scope of the invention as defined by the claims below. The above description of a preferred embodiment of the invention should not be read to limit the scope of applicant's invention which is defined by the following claims.

What is claimed is:

1. An apparatus having an internal system for supplying a fluid comprising:

a first compartment for containing the fluid;

a second compartment for containing the fluid, the second compartment having a fill opening through which the second compartment is supplied with the fluid;

an air lock channel having an upper end and a lower end, the first compartment and the lower end of the air lock channel having a fluid level control hole therebetween, the second compartment and the upper end of the air lock channel having a second opening therebetween;

a metering orifice formed in the lower end of the air lock channel through which fluid flows from the second compartment to the air lock channel until the fluid level in the air lock channel is equal to the fluid level in the second compartment; and said fluid level control hole being provided to allow fluid to flow from the air lock channel into the first compartment until the fluid level in the first compartment covers the fluid level control hole, whereby an air lock in the air lock channel and the second compartment substantially precludes dispensing fluid through the fluid level control hole until the water level in the first compartment drops below the fluid level control hole.

2. The apparatus of claim 1 wherein said apparatus is a planter.

3. The apparatus of claim 1 wherein said first compartment also contains soil and roots of a plant.

4. The apparatus of claim 1 further comprising a recessed rim disposed about the fill opening.

5. The apparatus of claim 1 further comprising a liner disposed inside the first compartment for confining soil and roots within the first compartment.

6. The apparatus of claim 1 wherein a plurality of a selectively closeable openings are provided in the air lock channel between the air lock channel and the first compartment.

7. The apparatus of claim 1 wherein said fill opening comprises a tube extending from a rim to a point adjacent the bottom of the apparatus.

8. The apparatus of claim 1 wherein said apparatus is formed in two pieces from molded plastic which are welded together.

9. A container comprising:

an open enclosure having a fluid level control hole in a lower portion of a first wall of the enclosure;

a reservoir;

a second wall defining an air lock channel extending vertically from a region adjacent the fluid level control hole to an opening in an upper region of the reservoir, said air lock channel having a metering orifice formed between the reservoir and the air lock channel in a lower portion of the air lock channel; and a fluid filling opening in the reservoir through which fluid is supplied to the reservoir, said fluid in the reservoir being provided to the open enclosure through the metering orifice and through the fluid level control hole successively until the fluid level in the open enclosure covers the fluid level control hole whereupon the air lock channel is sealed by the fluid in the open enclosure and the reservoir, wherein additional fluid is supplied by drawing fluid into the open enclosure through the fluid level control hole when the level of fluid in the open enclosure drops below the fluid level control hole.

10. The container of claim 9 wherein said container is a planter.

11. The container of claim 9 wherein said fluid filling opening comprises a tube extending from a rim to a point adjacent the bottom of the container.

12. The container of claim 9 wherein a liner is provided within the open enclosure to retain soil and root matter within the liner.

13. The container of claim 9 wherein said container is molded in two separate pieces and subsequently joined together.

14. A self-watering plant container comprising:

a cup-shaped soil and root compartment;

a reservoir having a fluid filling opening, said reservoir being defined by an outer wall extending about at least a portion of the soil and root compartment;

an air passage defined by a wall extending from a first port in a lower portion of the soil and root compartment to a second port in the reservoir disposed above the fluid level in the reservoir;

a metering orifice formed in the lower portion of the wall defining the air passage between the reservoir and the air passage; and a fluid level control hole formed between the air passage and the soil and root compartment.

15. The self-watering plant container of claim 14 wherein an inner container formed of screen mesh is provided to line the cup-shaped soil and root compartment.

16. The self-watering plant container of claim 14 wherein an air lock is formed in the air passage when water in the soil and root compartment is above the level of the fluid level control hole.

17. The self-watering plant container of claim 16 wherein a plurality of fluid level control holes are provided between the air passage and the soil and root compartment which are each adapted to be selectively closed by one of a plurality of plugs.

18. The self-watering plant container of claim 14 wherein the air passage is defined by a weir wall which extends from a base wall of the soil and root compartment to an upper portion of the reservoir.

19. The self-watering plant container of claim 14 wherein a fill tube is provided which extends from the fluid filling opening downwardly into the reservoir to a point adjacent the bottom of the reservoir.

20. The self-watering plant container of claim 14 wherein fluid is supplied through the fluid filling opening to the reservoir, said fluid in the reservoir being supplied through the metering orifice to the air passage, and water from the air passage being supplied to the soil and root compartment through the fluid level control hole, wherein the fluid level within the soil and root compartment is maintained at the level of the fluid level control hole.

* * * * *